UNITED STATES PATENT OFFICE.

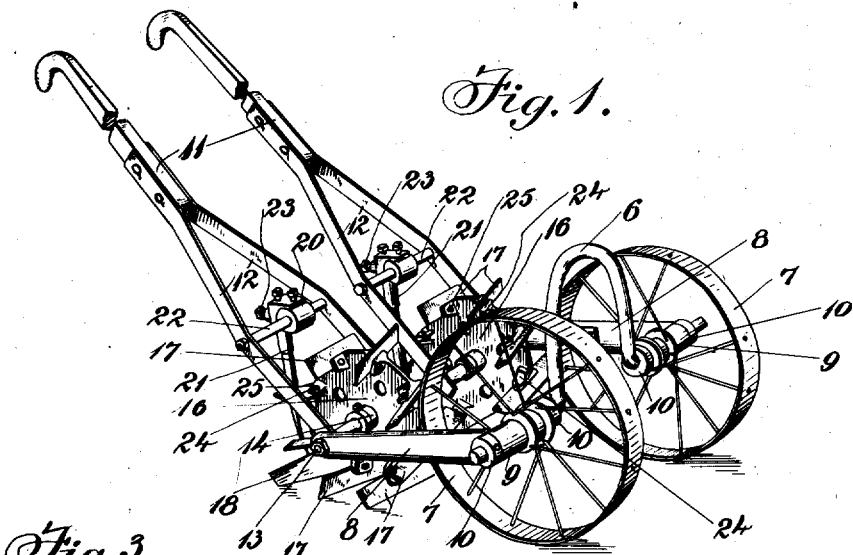
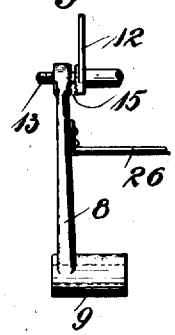
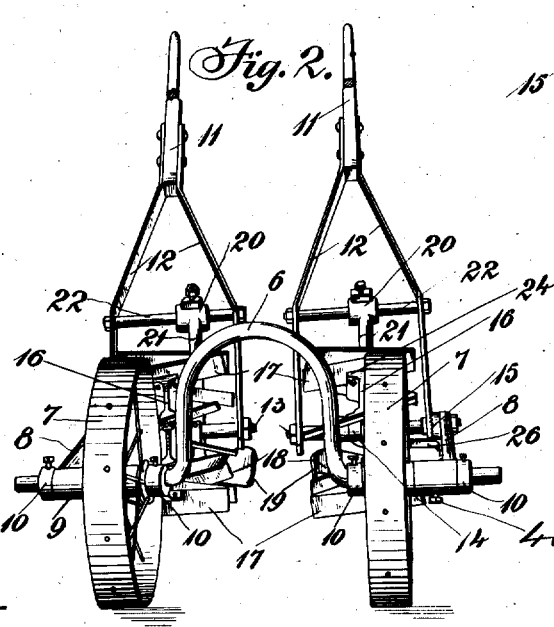
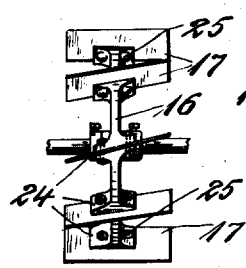
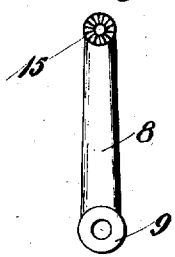

WALLACE W. STAUFFER, OF NAPPANEE, INDIANA.

CULTIVATOR.

No. 899,270.　　　Specification of Letters Patent.　　　Patented Sept. 22, 1908.

Application filed November 22, 1907. Serial No. 403,366.

*To all whom it may concern:*

Be it known that I, WALLACE W. STAUFFER, citizen of the United States, residing at Nappanee, in the county of Elkhart and State of Indiana, have invented certain new and useful Improvements in Cultivators, of which the following is a specification.

This invention relates to hand operated wheeled cultivators, and has for its object to provide an improved device of the kind, characterized particularly by separate frames at right and left hand, each of which carries a blade and a cultivating or mulching wheel. The construction is such that either set of implements and the frame which carries the same may be lifted out of action independently of the other.

The invention is illustrated in the accompanying drawings in which Figure 1 is a perspective view of the implement. Fig. 2 is a front elevation. Figs. 3, 4 and 5 are details.

Referring specifically to the drawings, 6 indicates an arched axle of sufficient height to pass over ordinary plants or vegetables found in gardens or the like. This axle is supported upon wheels 7. An arm 8 is fixed to each end of the axle, preferably outside of the wheel, and having a sleeve 9 through which the axle extends. The wheel hub and said sleeve are held between collars 10 on the straight ends of the axle, these collars being fixed at adjustment by set screws, which allows the arms and the wheels to be adjusted in or out on the axle, according to the width of the rows to be worked. One sleeve is fixed to the axle by a set screw 40. This supports the axle in upright position without other aid. The other sleeve is free to turn on the axle. Consequently either handle can be lifted.

The handle 11 is connected to the rear end of each arm 8 by means of a pair of spaced arms 12 and a bolt 13. The bolt extends inwardly from the end of the arm, so as to bring the handle in line behind the supporting wheel 7, the spread arms 12 being fixed at their upper ends to the lower end of the handle and at their lower ends to opposite ends of the bolt 13. The sleeve 14 is located between the lower ends of the arms and upon the bolt 13, and serves to space the arms apart, and also to support the cultivating wheel to be described. The contacting sides of the bearing at the end of the arm 8, and the corresponding side of the arm 12, are corrugated as at 15, to allow the handles to be set at any desired height or angle, which can be done by loosening the nuts on the bolts 13, and then adjusting the handles on the bolts 13 as pivots.

Each bolt 13 carries or supports a wheel 16 which has a series of transverse blades or cutters 17 projecting outwardly around its edge. These blades are set at an angle to the axis and are intended to cut into the ground and to break up the crust or surface thereof. Behind each of the wheels is a weeding and cultivating blade 18 which extends at a slight inclination across the line of motion and serves to cut under the surface of the ground and so act as a weeder and also, if desired, to ridge or hill up the soil along the row. The inner end of the knife is or may be turned up as indicated at 19. This knife is held by a clip 20 which engages the shank 21 of the knife. The shank extends through a vertical recess or bore in the clip or coupling, and the clip is mounted on a cross bolt 22 which extends between the arms 12 and through a horizontal bore formed in the clip. Set screws 23 engaging the shank and the bolt respectively, allow various adjustments to be made. Thus the shank of the knife may be moved up or down to raise or lower the blade. Said shank may also be turned in its socket, to vary the angle of the knife. The clip may also be turned on the bolt 23 to vary the angle of the shank and the cut of the knife, and furthermore may be moved lengthwise along said bolt to vary the lateral position of the knife and so set the knives closer together or farther apart, according to the crop being worked.

The wheels 16 consist of disks having lugs 24 on opposite sides of their edges, with a cross slit between the lugs, and the knives 17 set in these slits and are fastened by bolts 25.

The action of the arms 8 and the handles on opposite sides of the axle is independent, so that the handle and devices on one side can be swung up or lifted out of action independently of the other, each handle being independently operated by the right and left hands of the gardener.

When at work, the wheels of the blades cut up or disintegrate the ground and either loosen or cut the weeds so that the surface blades 18, following, will effectively cut out the grass and weeds, and also hill up the row if the knives are set for that purpose. The adjustment of the arms on the axles allows the knives to be regulated so as to cultivate as close or far apart as desired. The stationary knife is adjustable either to ridge the soil, as above stated, or to throw it out as desired. The rotary knives are so constructed that they will not readily choke, and it is to be noticed that the shank of the stationary knife is connected thereto at or about the middle thereof, so that the ends are open and grass or weeds will clear away therefrom without clogging. Scrapers 26 may be attached to the arms 8 for the purpose of scraping the main wheels 7.

I claim:

1. A cultivator having a wheeled axle, a rearwardly extending arm mounted on the axle, a bolt projecting laterally from the arm, a handle having branches pivotally connected to opposite ends of the bolt, a horizontal bar extending across between said branches, a blade having an upright shank, and a coupling between the bar and the shank.

2. A cultivator comprising an arched axle mounted on wheels, an arm connected to each end of the axle and extending rearwardly, a bolt projecting laterally from the rear end of each arm, a handle having branches connected to opposite ends of the bolt, a wheel provided with blades, on the bolt between said branches, and a blade carried by the handle and extending across behind said wheel.

In testimony whereof I affix my signature, in presence of two witnesses.

WALLACE W. STAUFFER.

Witnesses:
 WM. MILLER,
 JOHN STAUFFER.